United States Patent
Zaniboni

[19]

[11] Patent Number: 6,039,169
[45] Date of Patent: Mar. 21, 2000

[54] MULTILEVEL STORAGE DEVICE FOR CONTAINERS, IN PARTICULAR CD CASES

[75] Inventor: Carlo Zaniboni, Castenaso, Italy

[73] Assignee: Gima S.P.A., Via Dei Lombardi, Italy

[21] Appl. No.: 09/072,466

[22] Filed: May 5, 1998

[51] Int. Cl.$^7$ .................................................. B65G 1/00
[52] U.S. Cl. ...................... 198/347.1; 198/409; 198/444
[58] Field of Search ................... 198/347.1, 409, 198/444, 463.4, 464.2, 468.2, 468.6, 603

[56] References Cited

U.S. PATENT DOCUMENTS

| | | | |
|---|---|---|---|
| 2,799,384 | 7/1957 | Rutherford | 198/603 |
| 4,047,625 | 9/1977 | Grant | 198/468.6 |
| 4,372,723 | 2/1983 | De Coene et al. | 198/603 |
| 4,899,869 | 2/1990 | Johnson | 198/603 |

*Primary Examiner*—Joseph E. Valenza
*Attorney, Agent, or Firm*—Nims, Howes, Collison, Hansen & Lackert

[57] ABSTRACT

A multilevel storage device for CD cases includes at least two conveyors, upper and lower, respectively, leading to a feeding station which receives groups of containers having relative hinged edges suitably oriented. A station loads groups of cases on the lower conveyor and a transfer unit which picks up the groups of cases from a downstream end of said lower conveyor to the upper conveyor when sensor means detect absence of groups of cases at an upstream end of the upper conveyor. Presence of groups of cases at a downstream end of the upper conveyor, before the feeding station is detected by other sensor means.

13 Claims, 7 Drawing Sheets

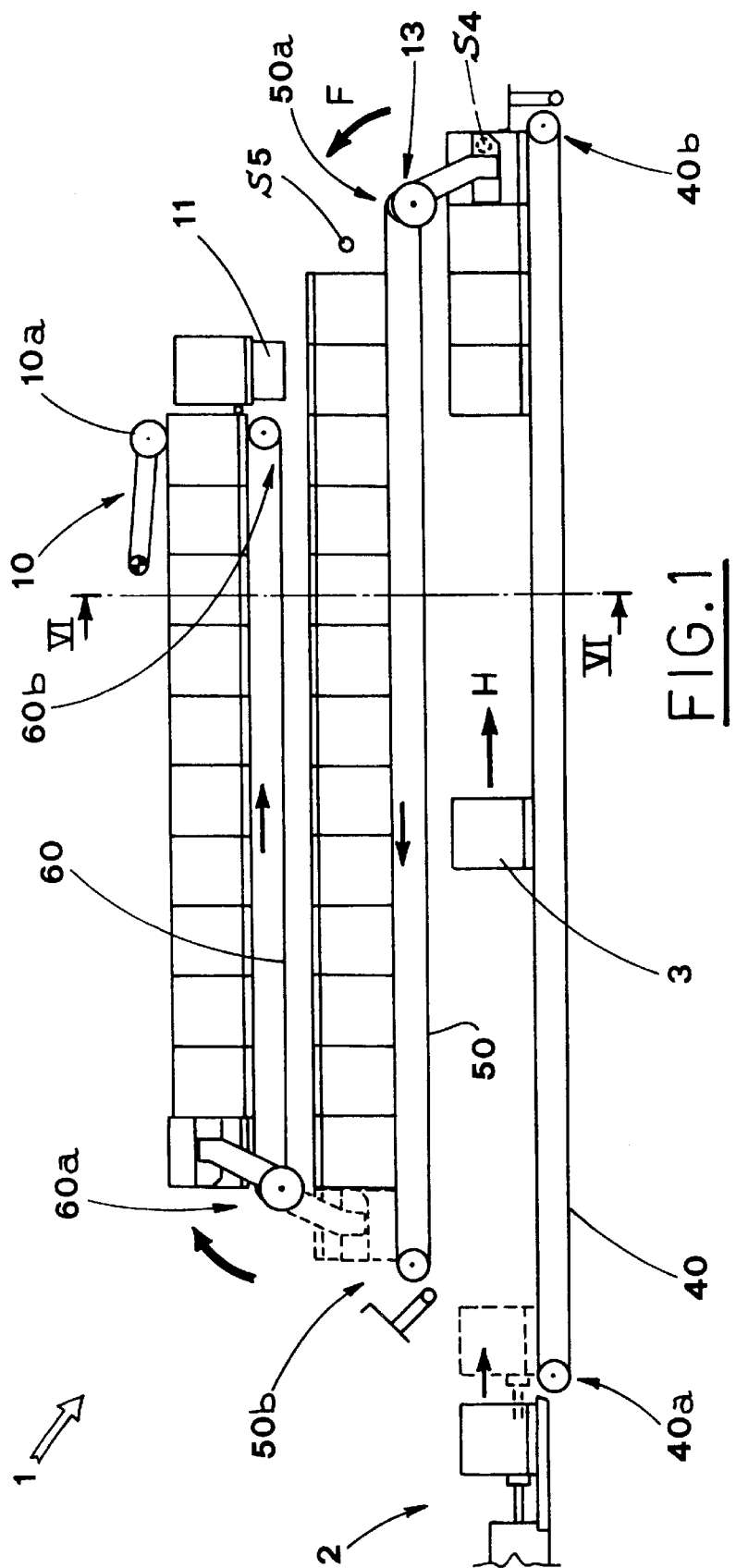

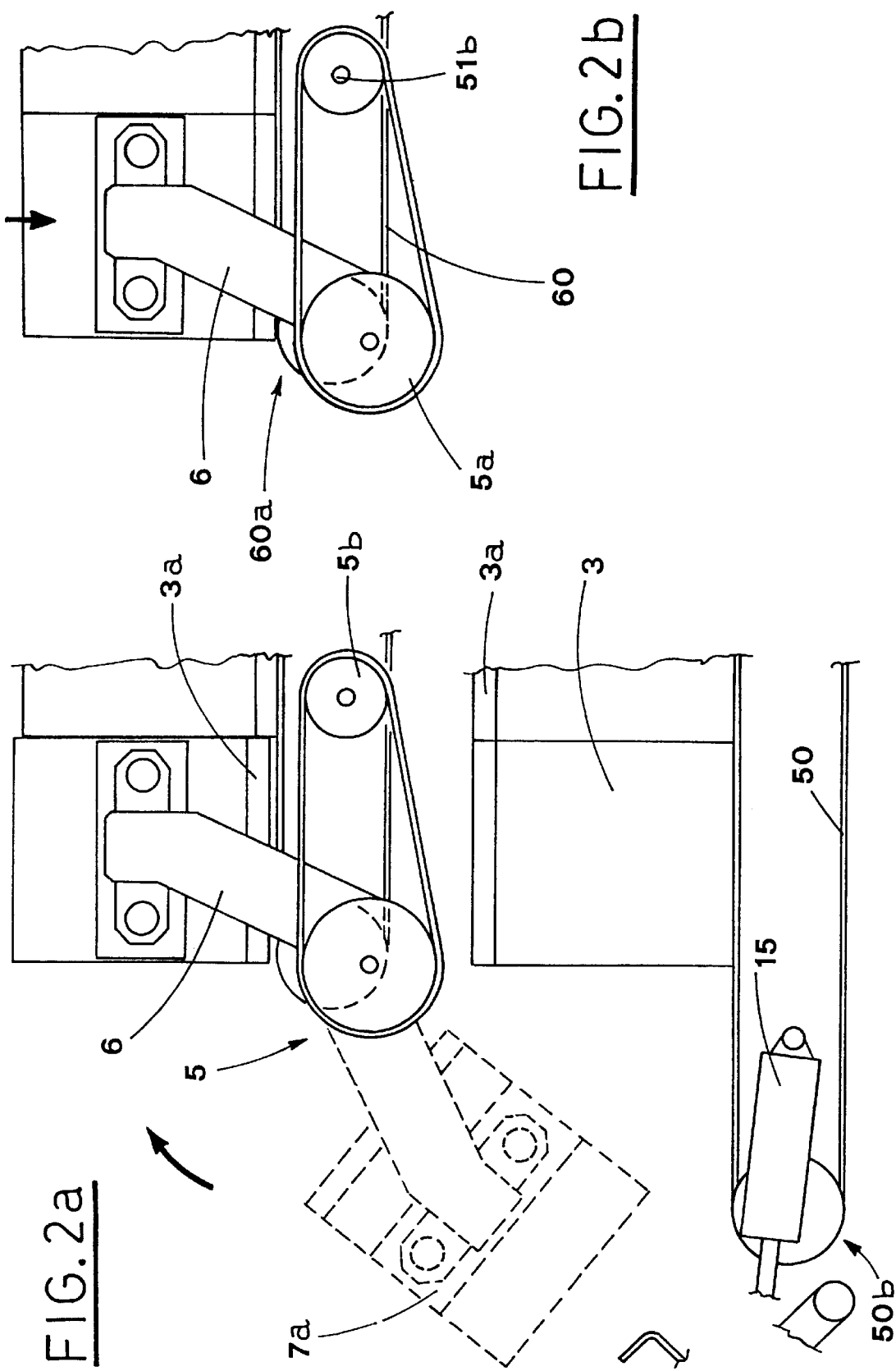

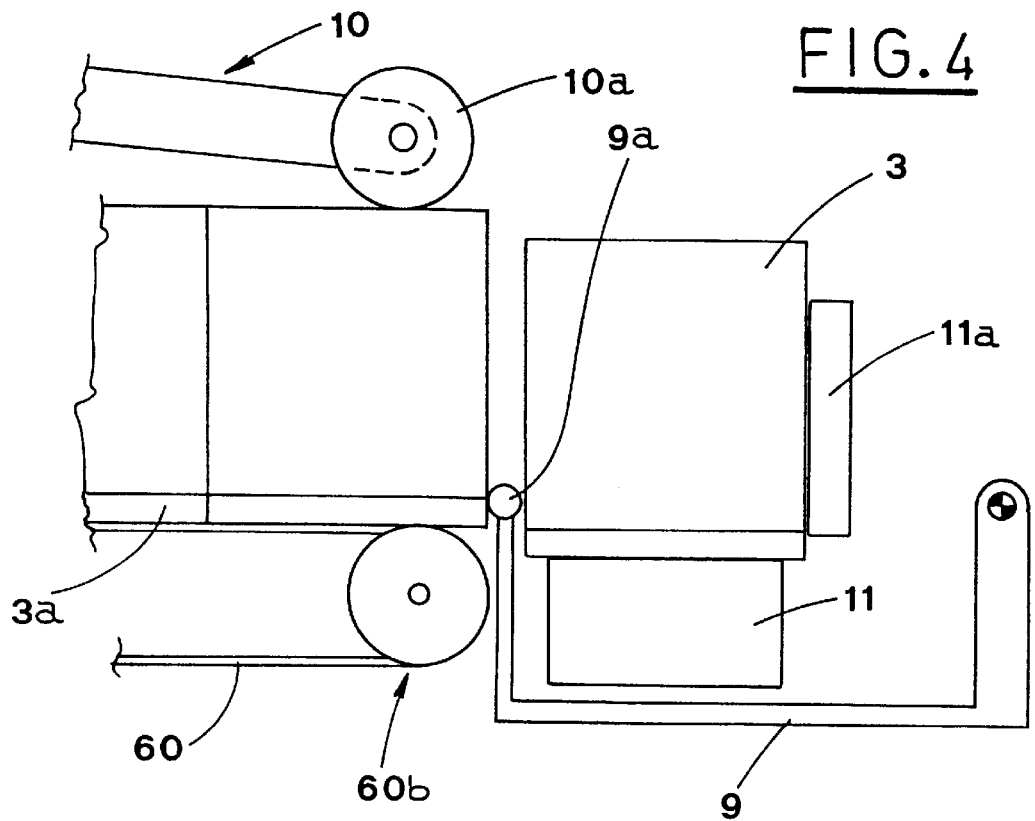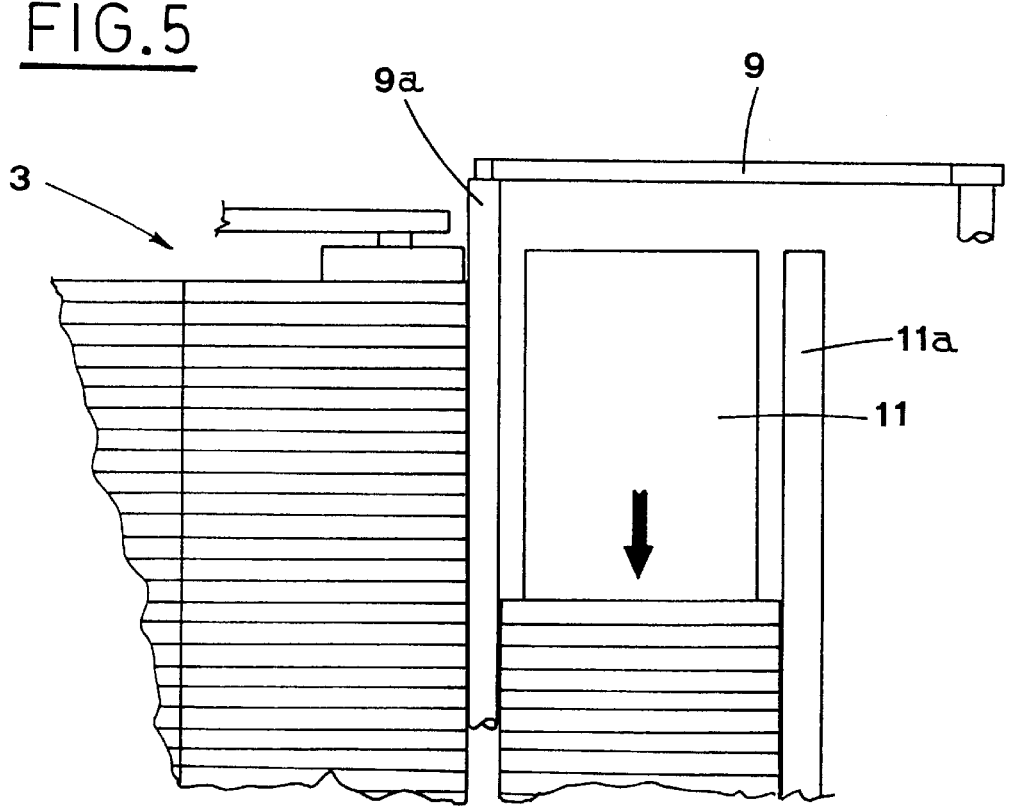

MULTILEVEL STORAGE DEVICE FOR CONTAINERS, IN PARTICULAR CD CASES

FIELD OF THE INVENTION

The present invention relates to a machine for handling cases for articles, in particular cases for CDs. More precisely, the invention relates to a multilevel storage device, particularly suitable for cases which open like a book.

BACKGROUND OF THE INVENTION

Compact discs, widely known as CD, are placed into containers or cases which include a base box-like element and a cover hinged to the base element along an edge.

Compact disc packaging machines include storage devices for the CD cases, formed by elongated storage modules, arranged horizontally and/or vertically.

In case of vertically arranged storage modules, the cases are moved due to the gravity force, while in case of horizontal storage modules, the cases are usually moved by conveying belts.

The autonomy of the above mentioned storage devices, both horizontal and vertical, and therefore of the whole packaging machine, including these storage devices, can be increased by providing more modules, arranged side by side, which perform cyclically their feeding operation by complex commutation systems.

The most important disadvantages of these storage devices, including singular modules or a plurality of modules suitably arranged side by side, derive from their small autonomy, in the first case, and in the second one, from difficulty to switch from a single module to another one. Switch form one module to the following one is necessary to increase reliability and reduce dimensions of the storage device.

The continuous increase of the CD use, due to the progressive expansion of data processing and audio-visual media market, requires packaging machines which must work with very high speed and productive capacity, not to extend delivery terms, and therefore, they need storage devices with bigger and bigger autonomy.

SUMMARY OF THE INVENTION

The object of the present invention is to provide a storage device for case, in particular CD cases, which can avoid the above mentioned disadvantages and guarantee longer autonomy and higher operational standard.

Another object of the invention is to provide a storage device with reduce longitudinal and/or transversal dimensions.

Another object of the present invention is to provide a case storage device obtained by a technical solution, which is simple, extremely reliable and practical, cheap and which can improve the subsequent case packaging step.

The above mentioned objects are obtained in accordance with the contents of the claims, by means of a multilevel storage device for articles, in particular cases, including a series of conveyors, arranged over one another, with at least two conveyors upper and lower respectively.

Downstream of the upper conveyor there is a receiving feeding station for receiving groups of cases from the upper conveyor and for feeding said cases for further processing.

A loading station is located upstream of the lower conveyor for loading groups of cases onto the lower conveyor, the cases being oriented in relation to requirements of said feeding station and taking into account a number of conveyors forming the series of conveyors.

A transfer unit is situated at the upstream end of the upper conveyor for picking up groups of cases from a conveyor situated below and for transferring them to the upper conveyor, while first sensor means are situated close to a downstream end of the lower conveyor for detecting presence of at least one group of cases.

Second sensor means situated close to the upstream end of the upper conveyor for detecting absence of groups of containers.

According to a preferred embodiment, an intermediate conveyor is interposed between the lower conveyor and the upper conveyor, with a second transfer unit situated at the upstream end of the intermediate conveyor for picking up groups of cases from the lower conveyor situated below and for transferring them to the intermediate conveyor.

Second sensor means are situated close to a downstream end of the intermediate conveyor for detecting presence of at least one group of cases, while second sensor means are situated close to the upstream end of the intermediate conveyor for detecting absence of groups of cases.

BRIEF DESCRIPTION OF THE DRAWINGS

The characteristic features of the invention will be pointed out in the following description of a preferred, but not limitative embodiment, with reference to the enclosed drawings, in which:

FIGS. 2, 2a,2b, 3 are lateral views relative to working sequences related to the storage device operation;

FIGS. 4, 4a,4b,4c,4d are schematic lateral views relative to operation sequences related to the storage device working near a station in which the cases are released;

FIG. 5 is a plan schematic view of the storage device close to a station in which the cases are released.

DESCRIPTION OF THE PREFERRED EMBODIMENT

Figure 1A:
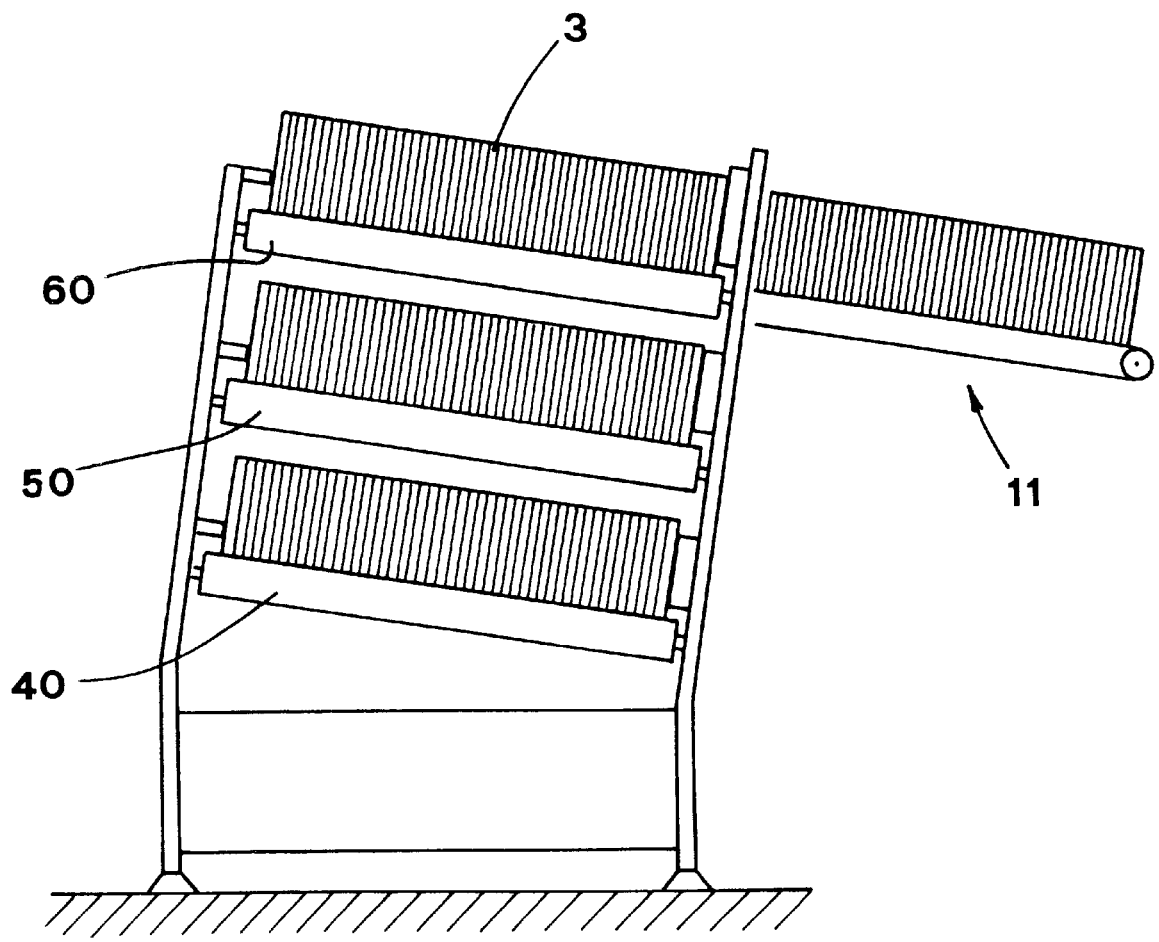
FIG. 1 is a schematic lateral view of the proposed storage device for cases, FIG. 1a showing the device in a slanted arrangement.

With reference to the above mentioned figures, a storage device for cases 1 extends through a plurality of levels, e.g. three, and is formed by a lower conveyor 40, an intermediate conveyor 50 and an upper conveyor 60.

Each of these conveyors 40,50,60 includes an endless looped belt mounted on about relative pulleys, namely a driving pulley and a driven pulley, respectively.

These conveyors are situated one over another according to a vertical symmetry plane and are arranged with their surfaces horizontal. However, the arrangement of the conveyors can be changed to provide certain effects, as it will be explained later on.

According to a different embodiment, for instance, as shown in FIG. 1a, the conveyors can be arranged with their surfaces lying on slanting parallel planes.

The conveyors 40, 50, 60, provided with lateral guides, not shown, become shorter at the upper levels (FIG. 1). This means that the upper conveyor 60 is the shortest, the lower conveyor 40 is the longest, and the intermediate conveyor 50 is longer than the upper one and shorter than the lower one.

In the following reference will be made to this configuration with shorter conveyors in the upper levels. However, it is possible to provide three or more conveyors having the same longitudinal extension.

The above mentioned storage device 1 is fed each time with a supply or group of lined up cases 3 or other suitable containers, properly oriented, by a loading station 2 situated in the region of an upstream end 40a of the lower conveyor 40.

This loading station 2 inserts groups of cases 3, suitably compacted and aligned, into the cases storage device 1 via the lower conveyor 40.

The cases 3 are suitably oriented in relation to the number of levels of the storage device 1, so that the hinged edge 3a of the cases will face downwards when the cases 3 exit the storage device, no matter of the number of conveyors making up the storage device.

In the present instance, since the conveyors are in number of three, the hinged edge 3a is turned downwards when the groups are introduced into the storage device.

As it will be clear in the following, overturning twice the cases 3 will result in the hinged edge 3a being down when the groups of cases exit the storage device.

The groups of cases 3 are transferred, always being kept crosswise to their movement direction H, from the downstream end 40b of the lower conveyor 40 to the upstream end 50a of the intermediate conveyor 50, by a transfer unit 13, fastened to this upstream end 50a of the intermediate conveyor 50.

Likewise, the groups of cases 3, arranged side by side during movement, are transferred from the downstream end 50b of the intermediate conveyor 50 to the upstream end 60a of the upper conveyor 60, by a similar transfer unit 13 fastened to the upstream end 60a of the upper conveyor 60.

Each of these transfer units 13 includes two driving groups 5 situated on both sides of the related upstream ends 50a, 60a of relative conveyors.

These driving groups 5 include two pulleys, first 5a and second 5b, the latter being keyed onto a driving shaft 51b.

The pulleys 5a,5b are connected by a toothed belt.

A moving arm 6, fastened to the first pulley 5a, forms, at the end opposite to this first pulley 5a, an packing block 7 equipped with a clamping plate 7a.

This clamping plate 7a is moved axially by an actuator 7b, e.g. a pneumatic cylinder, fastened to the moving arm 6.

The two driving groups 5 relative to the same transfer unit 13 are operated synchronously by the same actuator (not shown), e.g. pneumatic, which operates the driving shaft 51 b, common for both driving groups 5.

These transfer units 13 cooperate with relative first movable stops 8, formed by angles 8a integral with bars 8b suitably pivoted on the support structure of the subject conveyor.

Figure 2:
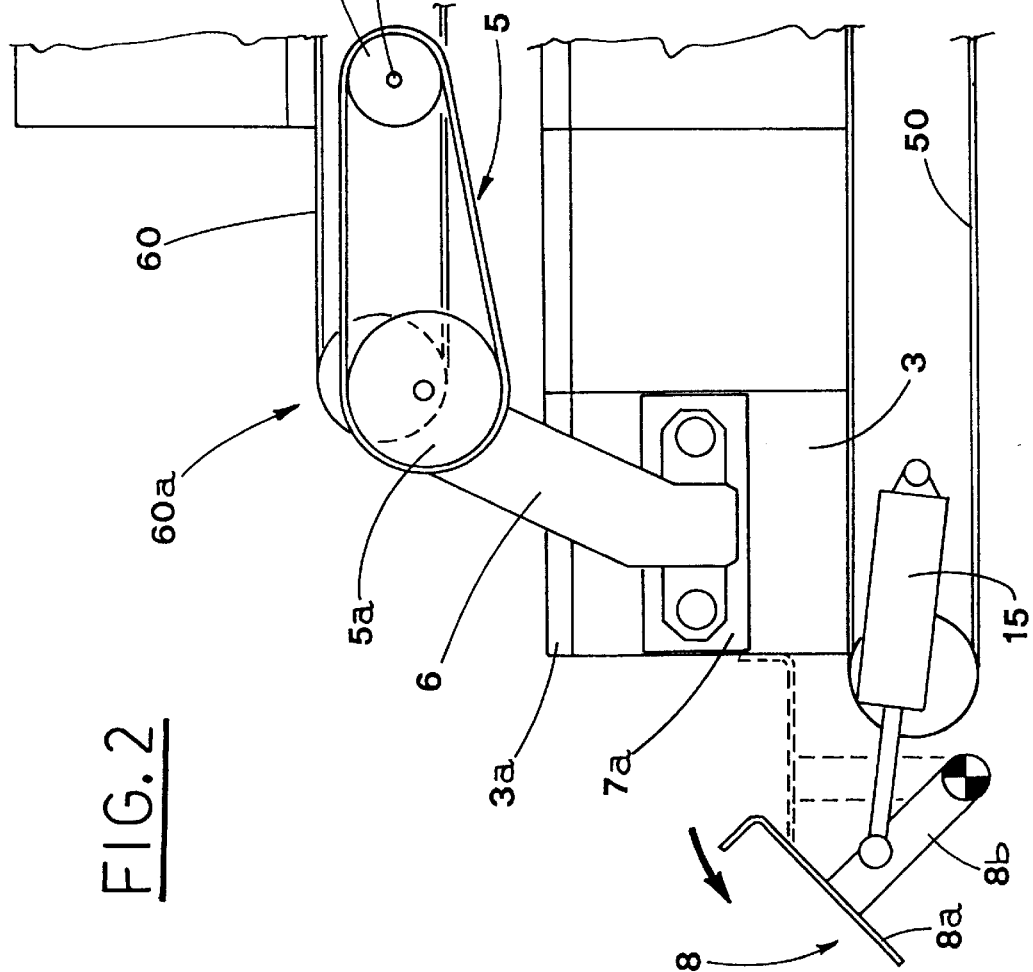

The bars 8b are pivoted, close to the angles 8a, to the stems of pneumatic jacks 15, which hinged to the support structure (FIG. 2).

A feeding station 11, e.g. for a packaging machine, is located beside the upper conveyor 60, on the side opposite to the corresponding transfer unit 13. The feeding station 11 is not shown in detail, and includes means for conveying the cases received from the storage device in a direction crosswise to the upper conveyor 60 while feeding the cases for further processing (see FIG. 5).

The feeding station is in fact a receiving station, when referred to the storage device, but it will be referred to as feeding station in the following, for better understanding.

The feeding station 11 also features a stationary stop 11a, that is crosswise to the upper conveyor advancement direction.

The groups of cases advancing on the conveyor are brought to strike the stop 11a thus falling into the feeding 11 station.

A stopping element 9a, e.g. a rod, is placed between the upper conveyor 60 and the feeding station 11 for dividing the groups of containers 3.

Figure 4A:
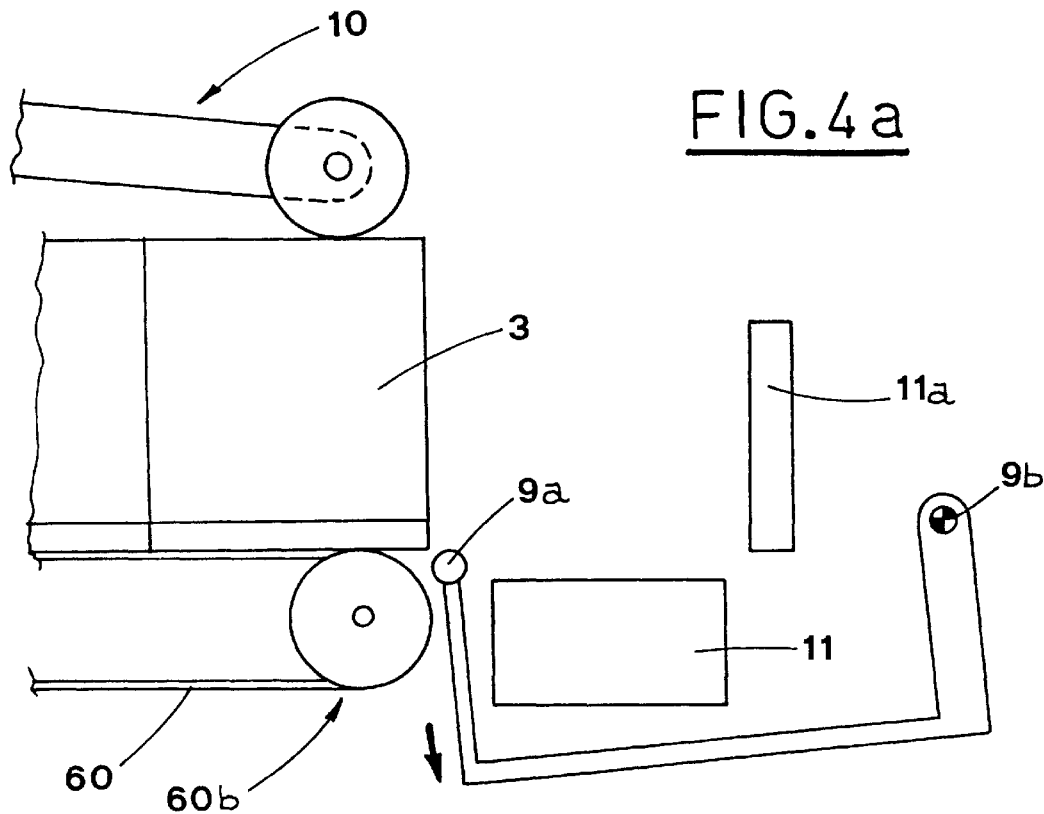
Figure 4B:
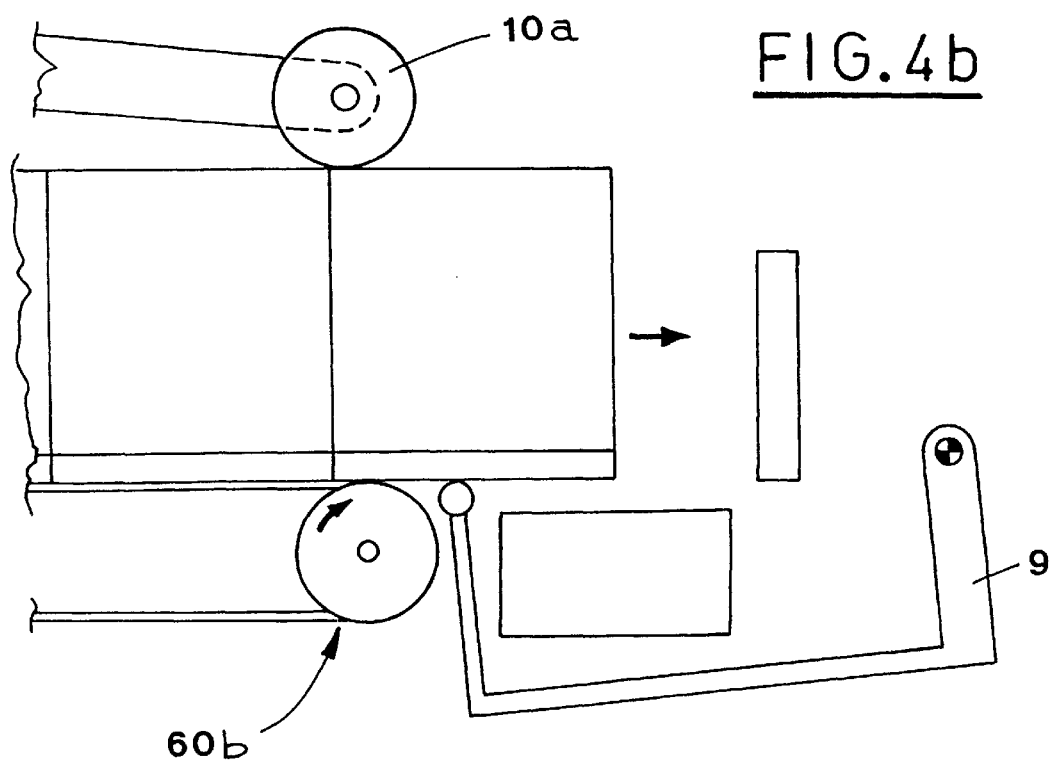

The stopping rod 9a is supported by a second removable stopping 9, formed by a frame having cross-section substantially "U"-like. The frame 9 is hinged on a stationary axle 9b with the upper end of the leg farther from the conveyor 60 (FIG. 4a).

With reference to the upper conveyor 60, the top of the group of cases 3 abutting against the stop rod 9a is held down by a hold-down member 10, whose terminal part has a idling roller 10a.

Operation of the disclosed storage device will be described in the following. Beginning from an intermediate working step of the cases storage device 1, the operator places a group of cases 3, with their hinged edges 3a suitable oriented, in the loading station 2.

Suitable devices, not shown, first compact and clamp the group of cases 3 and then push it on the lower conveyor 40.

The lower conveyor 40 is operated for a predetermined time, enough to move the group of cases just placed on it until it reach a group of cases previously loaded. In this case the operation time will be long enough to bring a group of cases from one end of the conveyor to the other one.

The operation time can be adjusted, so that it is also possible to set the operation time to a shorter value, being understood that the group of cases will be displaced in subsequent steps, each one corresponding to the operation time.

The group of cases 3 will remain located beside the group introduced previously.

In this situation, the leading group of cases 3 positioned on the downstream end 40b of the lower conveyor 40 strikes against the angle 8a of the first removable stop 8.

This situation is detected by suitable first sensor means S4 situated in the region of this downstream end 40b of the lower conveyor 40.

When second sensor means S5, situated at the upstream end 50a of the intermediate conveyor 50, on the part opposite to the loading station 2, detects absence of groups of cases 3, they operate the transfer unit 13 situated at the same upstream end 50a of the intermediate conveyor 50.

Figure 3:
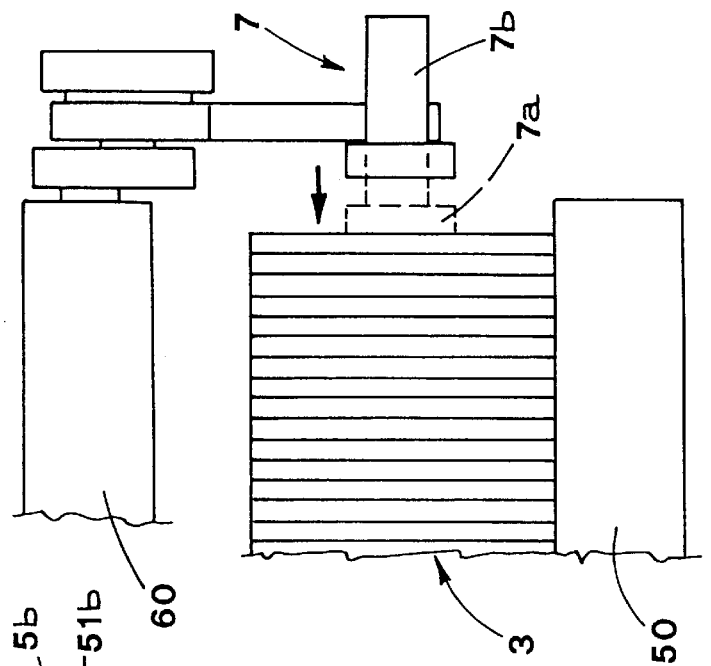

Consequently, the two opposite actuators 7b are activated, so as to compact, by the clamping plates 7a, the above mentioned group of cases 3 situated close to the downstream end 40b of the lower conveyor 40, stopped against the first removable stop 8 (FIG. 3).

The pneumatic jacks 15 are operated in time relation with the operation of the actuators 7a, causing rotation of the bars 8b and lowering of the angle 8a of the first removable stop 8.

This allows best operation of the transfer group 13 (FIG. 2).

The second pulleys 5b of the corresponding driving groups 5 are operated in time relation with the operation of the first removable stop 8, and make the movable arms 6 move, so as to cause a counterclockwise rotation in direction F beginning from the downstream end 40b of the lower conveyor 40.

Rotation F turns by 180° the lower and upper surfaces of the group of cases 3, that are maintained aligned due to the pressure of the packing block 7 performed by means of the clamping plates 7a, until this group of cases 3 is definitely placed on the intermediate conveyor 50.

Due to this transfer and 180° rotation, the hinged edges 3a of the picked up group of cases 3, which first was resting on the support surface of the lower conveyor 40, now is situated on the part opposite to the support surface of the intermediate conveyor 50 (FIGS. 2, 2a, 2b).

When the group of cases has been placed on the intermediate conveyor 50, the actuator 7b of the packing block 7 gradually diminishes the pressure of the relative clamping plates 7a on the group of cases 3, until the cases are released.

The angle 8a of the first removable stop 8 rises and the movable arms 6 of the relative driving groups 5 rotate clockwise in direction opposite to the direction F, in suitable time relation with the above mentioned release, so as to return to their position before the above described transfer.

The lower and intermediate conveyors 40, 50 taking part in this transfer are operated one step forward, in time relation with the above described movements, until the situation preceding the transfer group 13 operation is resumed.

Likewise, other sensor means, not shown, are provided close to the upstream end 60a of the upper conveyor 60 and of the downstream end 50b of the intermediate conveyor 50.

These sensor means, fulfilling the same functions as the first sensor means S4 and the second sensor means S5, detect the absence of the group of cases 3 at the upstream end 60a of the upper conveyor 60 and, consequently, operate the related transfer group 13.

The transfer of the group of cases 3, situated on the downstream end 50 of the intermediate conveyor 50, to the upper conveyor 60 occurs in the same way as previously described for the transfer from the lower conveyor 40 to the intermediate conveyor 50.

The consequent turn by 180° of the lower and upper surfaces of the group of cases 3 brings the hinged edge 3a of this group back to touch the surface of the upper conveyor 60.

In this way, the initial orientation of the groups of cases 3 in the loading station 2, is restored.

At the outlet of the containers storage device 1, close to the feeding station 11, the group of cases 3 situated at the downstream end 60b of the upper conveyor 60 strikes against the stop rod 9a, that is secured to the upper end of the leg of the second movable stop 9 closer to the conveyor.

This group of cases 3 is also held against the surface of this upper conveyor 60 by the action of the roller 10a of the hold-down member 10.

The feeding station 11 is provided with sensor means, not shown, which are properly arranged so as to detect absence of the group of cases 3 and operate the second movable stop 9.

Lowering of the second movable stop 9, caused by suitable rotation about the axis 9b, together with movement of the upper conveyor 60, make the groups of cases 3, situated on the upper conveyor 60, advance towards the feeding station 11.

The action of the hold-down member 10 on the group of cases 3 situated on the downstream end of the upper conveyor 60, prevents jamming during the transfer step.

Figure 4C:
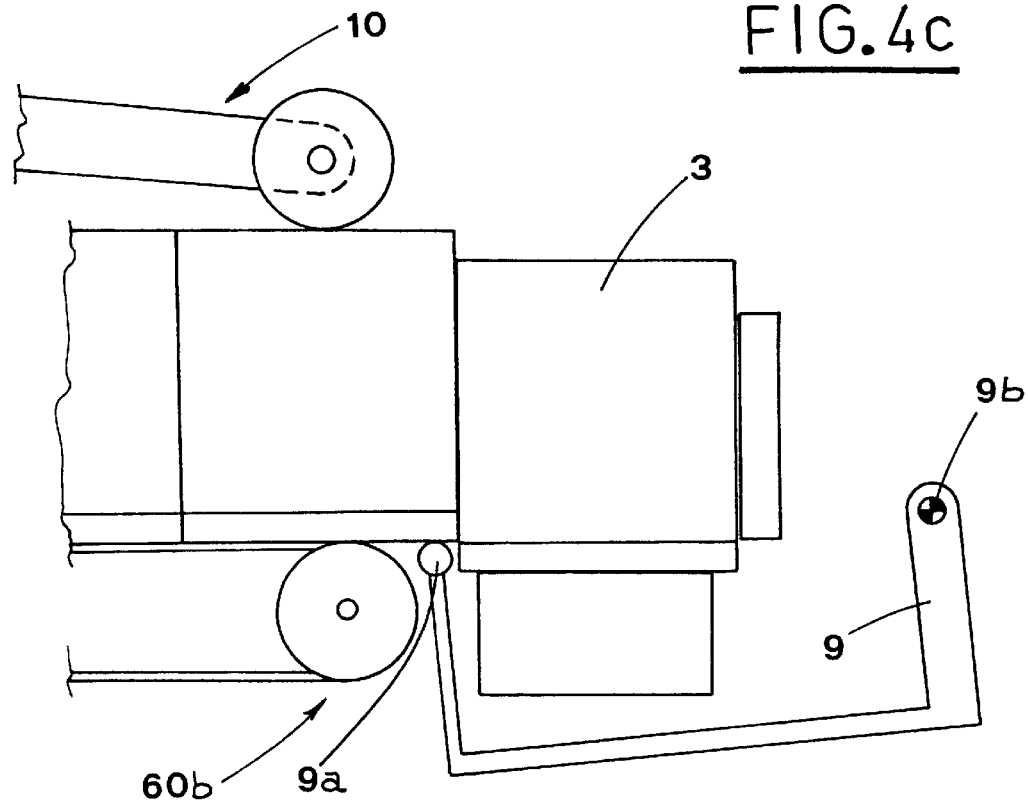
Figure 4D:
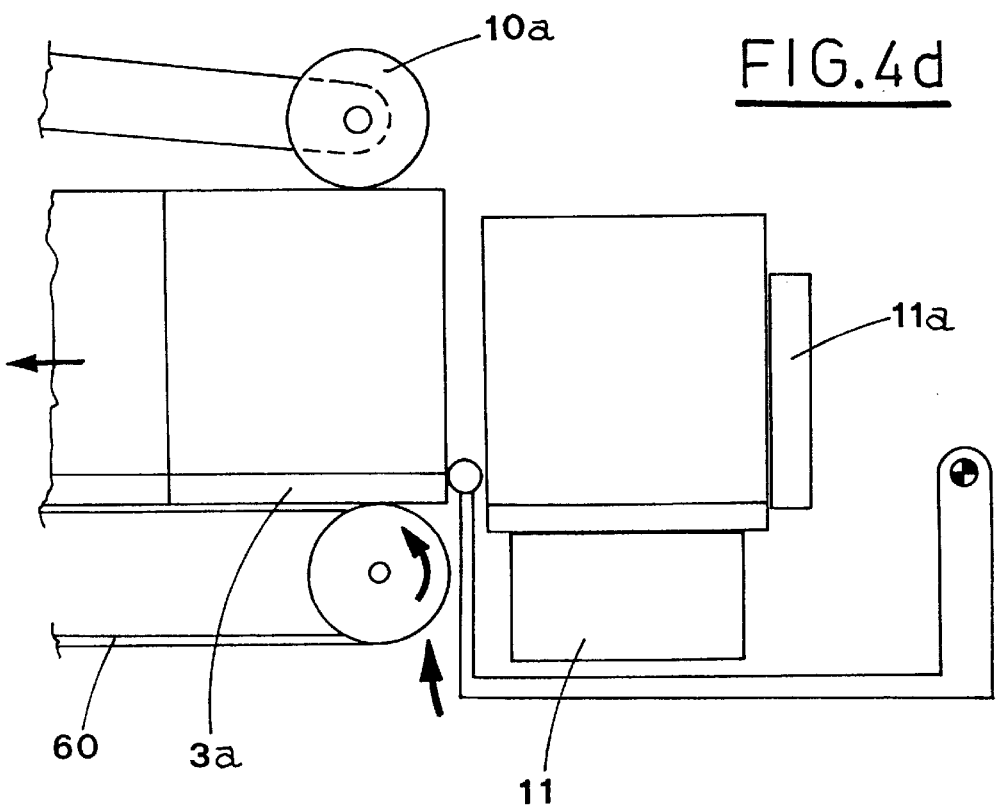

Movement of the cases goes on until the leading group of cases 3 strikes against the stationary stop 11a of the feeding station 11, thus making the upper conveyor 60 stop (FIG. 4d (not 4c as in Italian text p. 13) and the leading group of cases fall into the seat delimited by the feeding station 11 and the stationary stop 9.

This constructive and functional configuration ensures that the base surface of each group of cases 3 is always kept parallel to the seat of the feeding station 11 and to the upper run of the conveyor 60.

When the transfer operation is completed, rising of the stop rod 9a of the second movable stop 9 is preceded by a limited reverse rotation of the upper conveyor 60, so to avoid misalignment and mispositioning of the groups of cases 3 still present at the end of upper conveyor 60 (FIG. 4c, not 4d p. 14).

The advancement movement of the upper run of the upper conveyor is resumed, in time relation with the rising of the stop rod 9a, and the situation before the discharge of a group of cases due to down shifting of the second movable stop 9, is restored, with the leading group of cases 3 of the upper conveyor 60 striking against the stop rod 9a of the second movable stop 9.

It is to be pointed out that a certain number of links, connections and interlockings is required, to command the pneumatic devices, which control the storage device for containers 1. Links, connect ions and interlockings serve to impede contemporaneous contrasting movements of the above mentioned lower conveyor 40, intermediate conveyor 50 and upper conveyor 60, by introducing predetermined priorities.

The orientation of the hinged edges 3a of the groups of cases 3 introduced into the loading station 2, obviously depends on the number of conveyors forming the storage device for containers 1. This is required by the fact that the hinged edges 3a of the cases 3 in the feeding station 11 must be oriented in a precise way as the packaging machine requires.

If the groups of cases 3 inside the storage device 1 must be more packed and better lined up, it is possible to set the conveyors 40, 50, 60, as well as the feeding station, slanting downwards in the exiting direction of the feeding station 11.

This causes the need of edges for the conveyors aimed at reducing the sliding friction of the groups of cases 3 during transportation, and at the same time, at acting as a stop therefor.

For this purpose, it is sufficient to provide edges equipped with a series of idle rollers, situated along the lowest edge of the same conveyors.

A storage device obtained in this way reduces dramatically the need of room, both in longitudinal and transversal dimensions, and reduces substantially manpower needed for its correct operation, giving assurance of long autonomies when at work and maintaining high functionality standards.

Moreover, it is to be pointed out that, the number of elements of the above described storage device is limited and they are easy to produce, this being advantageous for production cost.

These advantages are obtained by a technical solution, which is simple, extremely reliable and practical, and allows to optimize subsequent packaging steps.

It is understood that what above has been described as a mere, non limitative example, therefore possible constructive variants remain within the protective scope of the present technical solution, as described above and claimed in the following.

What is claimed is:

1. A multilevel storage device for articles, in particular cases, including:
   a series of conveyors, arranged over one another, with at least two conveyors upper and lower respectively;
   first sensor means situated close to a downstream end of the lower conveyor for detecting a presence of at least one group of cases,
   second sensor means situated close to an upstream end of said upper conveyor for detecting an absence of groups of cases;
   a receiving feeding station, located downstream of said upper conveyor for receiving groups of cases from said upper conveyor and for feeding said cases for further processing;
   a loading station located upstream of said lower conveyor for loading groups of cases onto said lower conveyor, the cases being oriented in relation to requirements of said feeding station and taking into account a number of conveyors forming said series of conveyors;
   a transfer unit situated on both sides at the upstream end of the upper conveyor, the transfer unit having driving groups operated synchronously for picking up groups of cases from a conveyor situated below and for transferring them to said upper conveyor, movable arms equipped with packing blocks having clamping plates operated by actuators integral with the movable arms, in time relation with operation of said first and second sensor means.

2. The multilevel storage device, according to claim 1, further comprising a movable stop associated with the transfer unit for stopping said groups of cases, which is operated in time relation with said packing blocks and is situated at the downstream end of the lower conveyor, said movable stop being moved away when said groups of cases are transferred to the upper conveyor.

3. The multilevel storage device, according to claim 2, wherein said movable stop includes at least one angle supported by bars pivoted to a support structure of the lower conveyor, the bars linked to stems of pneumatic jacks which are constrained to the support structure.

4. The multilevel storage device, according to claim 1, wherein each of said driving groups includes a first pulley, integral with said movable arm and operated through a toothed belt by a second pulley keyed on a driving shaft operated for transferring of a group of cases.

5. The multilevel storage device, according to claim 1 further comprising an intermediate conveyor interposed between the lower conveyor and the upper conveyor;
   a second transfer unit situated at the upstream end of said intermediate conveyor for picking up groups of cases from said lower conveyor situated below and for transferring them to said intermediate conveyor;
   first sensor means situated close to a downstream end of said intermediate conveyor for detecting a presence of at least one group of cases;
   second sensor means situated close to said upstream end of said intermediate conveyor for detecting an absence of groups of cases.

6. The multilevel storage device, according to claim 1, wherein said upper conveyor is shorter than said lower conveyor.

7. The multilevel storage device, according to claim 5, wherein said upper conveyor is shorter than said intermediate conveyor and said intermediate conveyor is shorter than said upper conveyor.

8. The multilevel storage device, according to claim 1, wherein all the conveyors making up the storage device are located with their vertical symmetry planes lying on a common vertical plane.

9. The multilevel storage device, according to claim 1, wherein all the conveyors making up the storage device are arranged with their horizontal carrying surfaces lying on parallel slanting planes.

10. A multilevel storage device for articles, in particular cases, including:
    a series of conveyors, arranged over one another, with at least two conveyors upper and lower respectively;
    first sensor means situated close to a downstream end of the lower conveyor for detecting a presence of at least one group of cases;
    second sensor means situated close to said upstream end of said upper conveyor for detecting an absence of groups of cases;
    a receiving feeding station, located downstream of said upper conveyor for receiving groups of cases from said upper conveyor and for feeding said cases for further processing;
    a movable stopping frame situated at the downstream end of the upper conveyor for said groups of cases operated in time relation with detection of absence of said cases in said receiving feeding station;
    a loading station located upstream of said lower conveyor for loading groups of cases onto said lower conveyor, the cases being oriented in relation to requirements of said feeding station and taking into account a number of conveyors forming said series of conveyors;
    a transfer unit situated at the upstream end of the upper conveyor for picking up groups of cases from a conveyor situated below and for transferring them to said upper conveyor,
    a hold-down member pushing with an idling roller the group of cases situated at the downstream end of the upper conveyor, to keep a base surfaces of this group of cases substantially parallel to the receiving feeding station during the transfer thereto from the storage device.

11. A multilevel storage device, according to claim 10, wherein said receiving feeding station is equipped with a stationary stop for a group of cases being transferred from the downstream end of the upper conveyor.

12. The multilevel storage device, according to claim 10, wherein said movable stopping frame is "U" shaped and hinged to a stationary axle with an upper end of a leg farther from said upper conveyor.

13. The multilevel storage device, according to claim 12, wherein a stopping rod is fastened to a leg of said "U" shaped movable stopping frame closer to the downstream end of said upper conveyor.

* * * * *